United States Patent [19]

Martin et al.

[11] 4,145,285
[45] Mar. 20, 1979

[54] FUEL CONTAMINATION MONITOR HAVING A SHUT-OFF VALVE

[75] Inventors: William G. Martin, Bloomfield Hills; Anthony D. Simone, Troy, both of Mich.

[73] Assignee: Facet Enterprises, Inc., Tulsa, Okla.

[21] Appl. No.: 845,694

[22] Filed: Oct. 26, 1977

[51] Int. Cl.² .................. B01D 25/22; B01D 25/16
[52] U.S. Cl. ............................... 210/100; 210/315; 210/489; 210/493 R
[58] Field of Search ................. 210/96 R, 100, 132, 210/315, 133, 488, 489, 493 R

[56] References Cited

U.S. PATENT DOCUMENTS

| | | | |
|---|---|---|---|
| 2,604,994 | 7/1952 | Vocelka | 210/488 X |
| 2,657,808 | 11/1953 | Mankin | 210/315 |
| 2,911,101 | 11/1959 | Robinson | 210/315 X |
| 3,334,748 | 8/1967 | Bozek | 210/132 |
| 3,416,665 | 12/1968 | Kasten | 210/96 |
| 3,478,881 | 11/1969 | Bozek | 210/100 X |
| 4,053,409 | 10/1977 | Kuhfuss, Jr. | 210/315 X |

*Primary Examiner*—John Adee
*Attorney, Agent, or Firm*—Remy J. Van Ophem

[57] ABSTRACT

A fuel contamination monitor for separating particulate and liquid contaminants from a liquid fuel flowing through it has a liquid pervious housing enclosing layers of particulate matter separating filter media. A tubular liquid separating filter media is also disposed within the housing, and a liquid fuel outlet port through the wall of the housing communicates with the interior of the tubular liquid separating media. A shut-off valve is provided which interrupts the flow of liquid fuel through the filter unit in the event the media becomes too contaminated for effective contaminant separation.

11 Claims, 3 Drawing Figures

FUEL CONTAMINATION MONITOR HAVING A SHUT-OFF VALVE

BACKGROUND OF THE INVENTION

The present invention relates to liquid purification or separation devices, and more particularly to a device for separating particulate and liquid contaminants from a liquid fuel having a liquid pressure responsive cut-off means.

Some prior art fuel systems use monitoring devices located downstream of water separators and particulate matter separators.

Other prior art fuel systems utilize a fuel monitoring device incorporating a water separating media of sandwiched layered construction in place of a water separator rather than in combination therewith. These devices work satisfactorily in retaining or trapping fuel-borne liquid and solid contaminants if the fuel passing through them is of average quality, that is, contains a relatively small quantity of liquid contaminants such as water and solids. In addition, in such installations under limited fuel flow or low fuel pumping pressure operation, conditions can occur which may permit small quantities of water and submicron size particles to seep between the layers of the sandwiched media construction and flow to the outlet port of the device, the reason being that the construction of the device does not provide for a sufficient compression force on the sandwiched media construction to effectively close off the interface between layers of a separating media to preclude passage of submicron size particles and water therethrough.

Still other prior art fuel systems utilize a fuel monitoring device incorporating a particulate separating media which to some degree separates and absorbs fuel-borne liquid contaminants, beyond this point the device is permitted to pass liquid contaminants downstream. When the contamination level of the downstream effluent reaches a sufficiently high level it will cause a trigger to be released which will shut off flow through the device. Further, this type of fuel monitoring device only senses liquid contamination which can effect a positive shut off of fuel flow.

Therefore, there exists a need for a fuel monitoring and filtering unit which is capable of separating both liquid and submicronic particulate fuel-borne liquid contaminants, which will effectively operate under conditions of limited fuel flow and low fuel pumping pressure without allowing water seepage, and which will shut off continued fuel flow when either its capacity to separate particulate contaminants or its capacity to separate liquid contaminants from the fuel has diminished to a predetermined level.

SUMMARY OF THE INVENTION

It is an object of the present invention to obviate the drawbacks of the heretofore known fuel monitoring devices.

It is a further object of the present invention to provide a fuel contamination monitor construction which will prevent water seepage therethrough.

It is another object of the present invention to provide a fuse filter construction which will separate out fuel-borne liquid contamination.

It is yet another object of the present invention to provide a fuse filter construction which will separate out fuel-borne submicronic particulate contaminants.

It is a further object of the present invention to provide for fuel flow cut-off when the capacity of the device to effectively separate out water or particulate contaminants from the fuel is diminshed.

More particularly, the present invention provides a fluid filtering unit having a fluid pervious housing for the entrance therethrough of a fluid and an outlet port for the exit of the fluid. A plurality of layers of particulate matter separating media is provided within the housing and in juxtaposition thereto for separating submicron particulates from the fluid. A tubular filtering element for absorbing water is also disposed within the housing with the interior of the tubular filtering element in fluid flow communication with the outlet port of the housing. In addition, a valve is provided within the housing which is exposed both to fluid pressure inside the tubular filtering element and exterior to the housing so that when a predetermined pressure drop occurs across the valve, the valve closes the outlet port shutting off fuel flow through the unit.

BRIEF DESCRIPTION OF THE DRAWINGS

A better understanding of the present invention will be had upon reference to the accompanying drawings wherein like numerals refer to like parts throughout and in which.

DETAILED DESCRIPTION OF THE PREFERRED EMBODIMENT

Figures 1, 2:
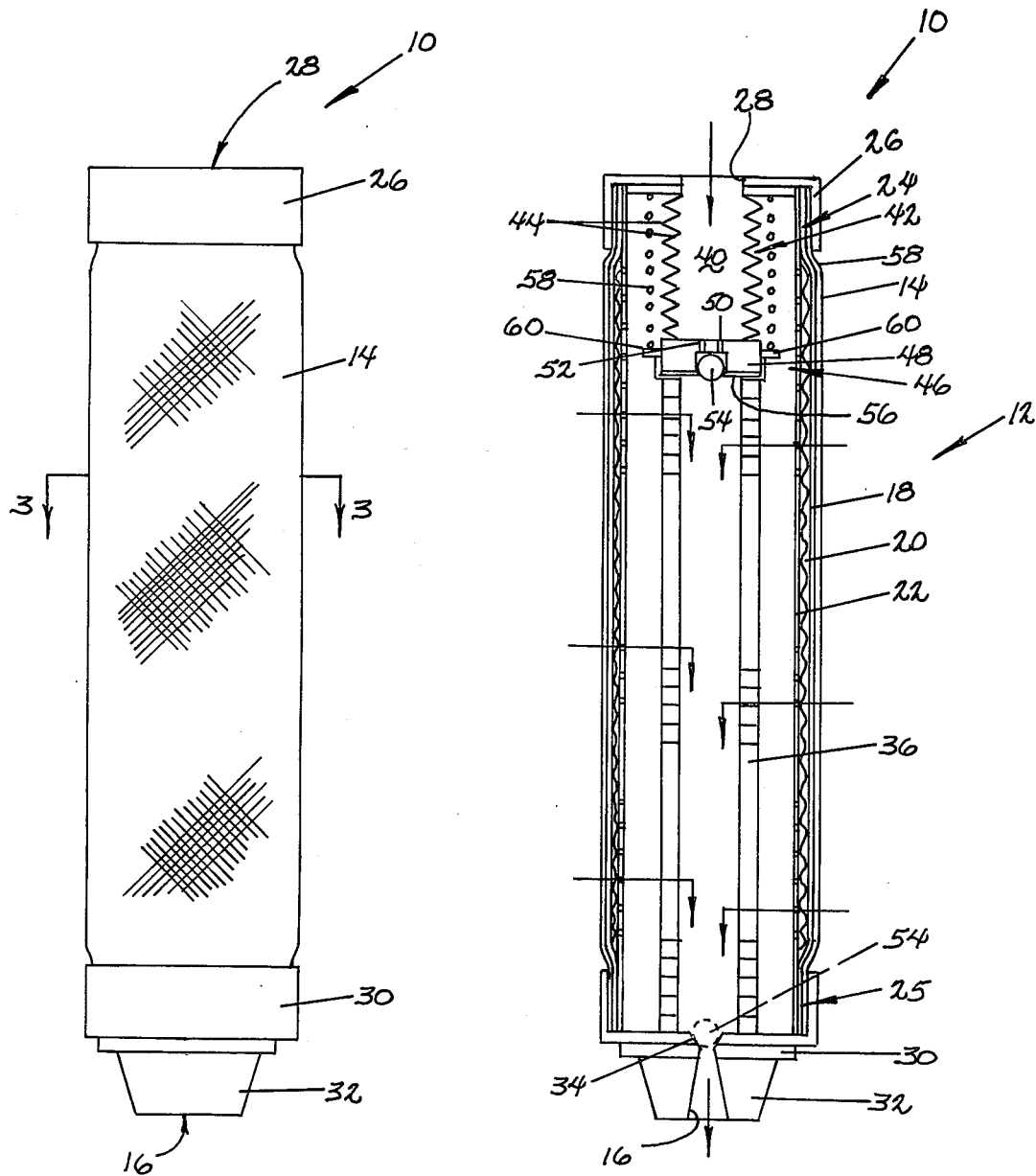
FIG. 1 is a side view of a fuse filter device of the present invention.
FIG. 2 is a longitudinal cross-sectional view of the fuse filter device of FIG. 1; and, FIG. 3 is a transverse cross-sectional view taken in the direction of arrows 3—3 in FIG. 1.

Referring to FIG. 1, there is shown a fluid separator or fuse filter device, generally denoted as the numeral 10, having a housing 12 with a fluid pervious wall 14 and a fluid outlet port 16. A fluid to be processed passes from the exterior of the fuse filter device to its interior through the pervious wall 14 and, after processing, passes out of the fuse filter device through the outlet port 16. Preferably, the housing 12 is cylindrical in shape and the outlet port 16 is formed at one end thereof.

In practice, a suitable material from which to form the housing wall 14 has been found to be a polyvinyl chloride coated fiberglass screen material.

Figure 3:
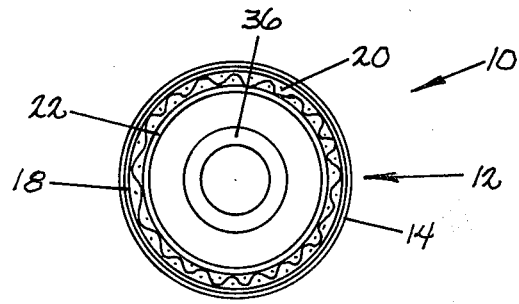

As can be best seen in FIGS. 2 and 3, the fuse filter device 10 further comprises a layer of filter media 18 disposed in confronting abutting relationship to the fluid pervious housing wall 14. This media is capable of separating submicron particulate material from the fluid. For example, a suitable filter media material has been found to be paper, fiberglass, cellulose, polyester or a combination thereof. Next, a layer of coarse wire mesh material 20 is disposed in confronting abutting relationship to the layer of filter media 18 interior to the housing 12. This layer of wire mesh screen 20 is used for drainage purposes. A layer of perforated metal 22, preferably aluminum, is disposed in confronting abutting relationship to the layer of coarse wire mesh 20 interior to the housing 12. This layer of perforated aluminum 22 adds structural strength to the housing while still allowing the fluid to pass through it.

It should be noted here that the preferred shape of the fuse filter device is cylindrical because this shape provides a continuous wall through which the fluid may pass. In addition, a cylindrical shape is inherently structurally strong. Because of the cylindrical shape of the housing 12, the layers of filter media 18, coarse wire mesh 20 and perforated aluminum 22 are also cylindrical and are concentrically disposed one to another and with the housing wall 14.

The ends 24 and 25 of the housing wall 14 can be, for example, necked down to a smaller diameter than the diameter of the major portion between the ends, and the cylindrical layer of filter media 18 and wire mesh 20 can be made coextensive with the length of the cylindrical housing wall 14. The cylindrical layer of perforated aluminum 22 can also be made coextensive with the length of the cylindrical housing wall 14 and of constant diameter along its length. Thus, the cylindrical layers of filter media are sandwiched between the inside surface of the cylindrical housing wall 14 and outside surface of the cylindrical layer of perforated aluminum at the opposite ends 24 and 25 of the fuse filter device.

An end cap 26 having an aperture 28 formed therethrough is connected to one end 24 of the housing wall 14, and another end cap 30 is connected to the other end 25 of the housing wall 12. The end cap 30 may, for example, have a nipple-like ferrule 32 defining the outlet port 16 from the housing. The ferrule 32 is also formed with an appropriate valve seat portion 34.

As can be best seen in FIG. 2, an axially compressible tubular filter element 36 capable of absorbing liquid contaminants is coaxially disposed within the perforated aluminum cylinder 22 with the wall of the tubular filter 36 spaced from the wall of the perforated aluminum cylinder 22. The tubular filter element 36 may be formed of a plurality of washer shaped disc elements in registered face-to-face contact arranged so that fluid flow through the filter element 36 will be radial through the interfaces between the discs. The washer shaped filter discs may be fabricated of paper, cellulose, or other suitable fibrous or non-fibrous material. One end of the cylindrical filter element 36 is in abutment with the housing 12 at the end cap 30 with the interior of the tubular filter element 36 in alignment with the outlet port 16.

A fluid chamber 40 is defined within the housing 12 between the end 24 thereof and the other end of the tubular filter element 36 from that end which is in abutment with the end cap 30. The chamber 40 is formed of a fluid impervious, generally cylindrical wall 42 coaxially oriented to the tubular filter element 36. Preferably, the cylindrical wall 42 is formed with annular pleats 44 which allow the wall 42 to longitudinally axially expand and contract in a bellows-like fashion when the tubular filter element 36 expands as it absorbs liquid contaminants. The chamber 40 is open at one of its ends to the aperture 28 in the end cap 26, thus, placing the chamber 40 in fluid communication with the ambient surroundings outside of the housing 12.

Valve means, generally denoted as the numeral 46, is interposed between the fluid chamber 40 and the end of the tubular filter element adjacent to the chamber 40. The valve means 46 comprises a valve retaining member 48 sandwiched between the edge of the cylindrical wall 42 defining the chamber and the end of the tubular filter element 36. The valve retaining member 48 defines a ball socket 50 in general alignment with the interior of the tubular filter element 36 and has at least one fluid aperture 52 formed through the wall of the socket 52 to establish a fluid passageway between the chamber 40 and interior of the tubular filter element 36 across the valve means. A detachable valve member in the form of a ball 54 is detachably received within the ball socket 50 to seal the fluid aperture 52. The ball 54 is detachably held in the ball socket 50 to normally seal or close the fluid aperture 52 by means of a resilient ball retaining flange 56 which is attached to the valve retaining member 48 and extends radially inwardly of the socket 50 at the open side of the socket. The ball 54, when in the position closing the fluid aperture 52 through the wall of the socket 50 is disposed in the socket between the socket wall and ball retaining flange 56. The resilient ball retaining flange 56 releasably contacts the ball 54 and biases it into the pocket. Thus, the valve means 46 has one side exposed to fluid pressure inside the tubular filtering element 36 and the other side exposed to the fluid pressure outside the housing 12 via the chamber 40 so that when a predetermined pressure drop occurs across the valve means 46 the differential pressure communicated to the ball 54 through the fluid aperture 52 will exert a force against the ball 50 greater than the force exerted on the ball 50 by the ball retaining flange 56, thus, forcing the ball 50 out of the socket 52 past the ball retaining flange 56 and driving it into the valve seat 34 of the ferrule 32 shutting off further fluid flow out of the outlet port 16 in the housing.

An axial compressive force is exerted on the tubular filter element 36 by means of, for example, a preloaded coil spring 58 generally coaxially disposed with the tubular filter element 36 and generally concentrically disposed with the fluid impervious cylindrical wall 42 of the chamber 40. The coil spring 58 is disposed in a state of axial compression between the end cap 26 at one end of the housing and a radially extending spring abutment flange 60 disposed between the valve retaining member 48 and end of the tubular filter element 36. This arrangement places the tubular filter element 36 under the desired axial compression but still allows it to expand as it absorbs liquid contaminants.

As indicated by the flow arrows in FIG. 2, a liquid fuel to be filtered passes generally radially inwardly of the housing 12 through the fluid pervious wall 14, through the layer of filter media 18, through the layer of coarse wire mesh 20, through the layer of perforated aluminum 22 and into the space between the layer of perforated aluminum 22 and tubular filter element 36 and in so doing, particulate matter contaminants are separted from the liquid fuel. The liquid fuel now clean of particular contaminants is prevented from passing into the chamber 40 because the cylindrical wall 42 is fluid impervious. Concurrently, liquid fuel also passes through the aperture 28 in end cap 26 and into the chamber 40. The liquid fuel in the chamber 40 is prevented from passing out of the chamber 40 through the aperture 52 by the ball 54 which is seated in the socket 50. The liquid fuel now radially passes from the space between the tubular filter element 36 and perforated aluminum layer 22 through the walls of the tubular filter element 36. The tubular filter element 36 will absorb liquid contaminants, such as water, in the liquid fuel as it passes through the walls of the tubular filter element into the interior of the tubular filter element. The now clean fuel passes out of the fuel contamination monitor device through the outlet port 16 to be conveyed to a fuel user (not shown) such as an engine or fuel reservoir such as a fuel tank.

Particulate matter contaminants separated from the fuel will eventually accumulate on the exterior of the wall 14, and in the filter media layer 18 until their capacity to effectively separate particulate contaminants is diminished or they otherwise become blocked with separated particulate matter. Likewise, water separated by the tubular filter element 36 will eventually cause it to swell to a point where its ability to absorb further amounts of water is detrimentally affected and further liquid fuel flow through the tubular filter element will be restricted. When either situation occurs, the fuel pressure inside the chamber 40 will exceed the fuel pressure inside the tubular filter element 36, and when the predetermined fuel pressure differential has been reached, the valve ball 54 will be ejected from the ball socket 50 and driven into the valve seat 34 blocking the outlet port 16 and shutting off further liquid fuel flow. At this point, the blocked fuel contamination monitor device is removed and replaced with another fresh fuel contamination monitor device.

Thus, it can be seen that in the fuel contamination monitor device of the present invention, the valve means 46 will close the outlet port 16 shutting off fuel flow when either of two events takes place. In the event that the pressure drop across the exterior wall 14 and a filter media layer 18 exceeds the predetermined fuel pressure differential the valve means 46 will close the outlet port 16. In the other event that the pressure drop across the tubular filter element 36 exceeds the predetermined fuel pressure differential, the valve means will close the outlet port 16.

The foregoing detailed description is given primarily for clarity of understanding and no unnecessary limitations should be understood therefrom, for modifications will be obvious to those skilled in the art upon reading this disclosure and may be made without departing from the spirit of the invention or the scope of the appended claims.

What is claimed is:

1. A fluid filtering unit comprising:
   a housing having fluid pervious walls for the entrance therethrough of a fluid, and an outlet port for the exit therefrom of the fluid;
   a tubular filtering element disposed within the housing permitting fluid flow therethrough from the outside to the inside of the tubular filtering element, said tubular filtering element being in a alignment with said outlet port;
   means placing said tubular filtering element under a predetermined axial compression;
   valve means disposed at the other end of said tubular filtering element normally closing that end of said tubular filtering element to the passage of fluid, said valve means having one side exposed to fluid pressure inside said tubular filtering element and the other side exposed to fluid pressure outside of said housing so that when a predetermined pressure drop occurs across said valve means, said valve means concurrently opens the end of the tubular filtering element at which it is disposed and closes said outlet port thereby preventing further fluid flow through the filtering unit and,
   a layer of filtering media disposed within said housing in confronting relationship to said fluid pervious housing wall for separating submicronic particulate matter from the fluid as it passes through said fluid pervious housing wall, said filtering media and said tubular filtering element being in series fluid communication, such that, when a fluid enters said housing through said fluid pervious walls and said filtering media, said fluid next passes through said filtering tubular element toward said outlet, said fluid communication through said outlet being terminated when the pressure drop across either said tubular filtering element and/or said particulate filtering media is above a predetermined level.

2. The fluid filtering unit defined in claim 1, further comprising:
   means defining a fluid chamber disposed within said housing, said chamber being in fluid communication with the side of said valve means on the opposite side thereof from said tubular filtering element, and also being in fluid communication with the outside of said housing.

3. The fluid filtering unit defined in claim 2, wherein said means defining said fluid chamber comprises a generally cylindrical wall, said cylindrical wall being coaxially disposed with said tubular filtering element with one end of the cylindrical wall in abutment with said housing and the other end in abutment with said valve means.

4. The fluid filtering unit defined in claim 3, wherein said generally cylindrical wall defining said chamber further comprises a plurality of annular pleats.

5. The fluid filtering unit defined in claim 4, wherein said chamber is in fluid communication with the outside of said housing through an aperture formed in said housing.

6. The fluid filtering unit defined in claim 2, wherein said valve means comprises:
   a valve retaining member interposed between said fluid chamber and said tubular filtering element; and,
   a valve member detachably retained in a closed position by said retaining member;
   when the predetermined pressure drop occurs across said valve means, said valve member is thereby caused to detach from said retainer member and coact with said outlet port closing said outlet port.

7. The filtering unit defined in claim 6, wherein:
   said valve retaining member defines a ball socket, and has at least one fluid aperture through the wall of the socket;
   said detachable valve member is a ball received within said socket to seal said at least one aperture; and further comprising
   a resilient ball retaining flange attached to said valve retaining member and releasably contacting said ball at the open side of said ball socket to releasably hold said ball in said socket.

8. The filtering unit defined in claim 1, wherein said means placing said tubular filtering element under a predetermined axial compression comprises a preloaded coil spring coaxially disposed with said tubular filtering element and in abutment with said housing.

9. The filtering unit defined in claim 1, further comprising a layer of wire mesh material disposed within said housing in confronting relationship to said layer of filtering media.

10. The filtering unit defined in claim 9, further comprising a layer of perforated material disposed within said housing in confronting relationship to said layer of wire mesh material.

11. The filter unit defined in claim 1, wherein said housing wall is fabricated by a fiberglass screen material.

* * * * *

UNITED STATES PATENT AND TRADEMARK OFFICE
CERTIFICATE OF CORRECTION

PATENT NO. : 4,145,285

DATED : March 20, 1979

INVENTOR(S) : William G. Martin & Anthony D. Simone

It is certified that error appears in the above-identified patent and that said Letters Patent are hereby corrected as shown below:

Column 5, line 59, after the word "unit" insert therefore ----;----.

Signed and Sealed this

Third Day of July 1979

[SEAL]

Attest:

Attesting Officer

LUTRELLE F. PARKER
Acting Commissioner of Patents and Trademarks